(12) United States Patent
Imano et al.

(10) Patent No.: US 10,632,535 B2
(45) Date of Patent: Apr. 28, 2020

(54) COBALT BASED ALLOY ADDITIVE MANUFACTURED ARTICLE, COBALT BASED ALLOY PRODUCT, AND METHOD FOR MANUFACTURING SAME

(71) Applicant: MITSUBISHI HITACHI POWER SYSTEMS, LTD., Kanagawa (JP)

(72) Inventors: Shinya Imano, Yokohama (JP); Yuting Wang, Yokohama (JP); Shigenobu Eguchi, Yokohama (JP); Yoshitaka Uemura, Yokohama (JP); Norihiko Motoyama, Yokohama (JP); Takanao Komaki, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 16/124,978

(22) Filed: Sep. 7, 2018

(65) Prior Publication Data

US 2019/0076926 A1    Mar. 14, 2019

(30) Foreign Application Priority Data

Sep. 8, 2017    (JP) .................. 2017-172999

(51) Int. Cl.
*B33Y 80/00* (2015.01)
*B33Y 10/00* (2015.01)
(Continued)

(52) U.S. Cl.
CPC .............. *B22F 3/1055* (2013.01); *B22F 3/24* (2013.01); *C22C 19/07* (2013.01); *C22F 1/10* (2013.01);
(Continued)

(58) Field of Classification Search
None
See application file for complete search history.

(56) References Cited

U.S. PATENT DOCUMENTS 5,640,667 A     6/1997  Freitag et al.
2012/0279351 A1  11/2012 Gu et al.
(Continued)

FOREIGN PATENT DOCUMENTS

JP    61-243143 A      10/1986
JP    H06-287667   *  10/1994
(Continued)

OTHER PUBLICATIONS

Yuan et al., "Effect of Nitrogen on Microstructure and Properties of a Cast Cobalt-Base Superalloy", Jul. 4, 2011, Advanced Materials Research, vol. 278, pp. 472-478. (Year: 2011).*
(Continued)

*Primary Examiner* — Xiaobei Wang
(74) *Attorney, Agent, or Firm* — Volpe and Koenig, P.C.

(57) ABSTRACT

There is provided an additive manufactured (AM) article formed of a Co based alloy having a composition comprising: in mass %, 0.08-0.25% C; 0.1% or less B; 10-30% Cr; 30% or less in total of Fe and Ni, the Fe being 5% or less; 5-12% in total of W and/or Mo; 0.5-2% in total of Ti, Zr, Nb and Ta; 0.5% or less Si; 0.5% or less Mn; 0.003-0.04% N; and the balance being Co and impurities. The AM article comprises crystal grains with an average size of 10-100 μm. In the crystal grains, segregation cells with an average size of 0.15-1.5 μm are formed, in which components constituting an MC type carbide phase comprising the Ti, Zr, Nb and/or Ta are segregated in boundary regions of the cells, and/or grains of the MC type carbide phase are precipitated at an average intergrain distance of 0.15-1.5 μm.

17 Claims, 6 Drawing Sheets

(51) Int. Cl.
 *B22F 3/24* (2006.01)
 *B22F 3/105* (2006.01)
 *C22C 19/07* (2006.01)
 *C22F 1/10* (2006.01)
 *B22F 5/04* (2006.01)
 *C22C 1/10* (2006.01)
 *C22C 1/04* (2006.01)
 *B22F 1/00* (2006.01)

(52) U.S. Cl.
 CPC .............. *B22F 1/0011* (2013.01); *B22F 5/04* (2013.01); *B22F 2003/248* (2013.01); *B22F 2301/15* (2013.01); *B22F 2304/10* (2013.01); *B22F 2998/10* (2013.01); *B22F 2999/00* (2013.01); *B33Y 80/00* (2014.12); *C22C 1/0433* (2013.01); *C22C 1/10* (2013.01)

(56) References Cited

U.S. PATENT DOCUMENTS

| | | |
|---|---|---|
| 2016/0200045 A1 | 7/2016 | Hopkins et al. |
| 2016/0258298 A1 | 9/2016 | Channel et al. |

FOREIGN PATENT DOCUMENTS

| | | | |
|---|---|---|---|
| JP | 7-179967 A | | 7/1995 |
| JP | H09-157780 | * | 6/1997 |
| JP | H9-157780 A | | 6/1997 |
| JP | S55-76038 B2 | | 8/2014 |
| JP | 2015-072007 A | | 4/2015 |
| JP | 2016-029217 A | | 3/2016 |
| JP | 2016-535169 A | | 11/2016 |
| JP | 2017-145483 A | | 8/2017 |
| JP | S63-11638 B2 | | 4/2018 |
| WO | 97/10368 A1 | | 3/1997 |
| WO | 2013/087515 A1 | | 6/2013 |

OTHER PUBLICATIONS

Extended European Search Report dated Nov. 8, 2018 for the European Patent Application No. 18192365.7.
Extended European Search Report dated Dec. 4, 2019 for the European Patent Application No. 19197441.9.
Extended European Search Report dated Dec. 4, 2019 for the European Patent Application No. 19197443.5.
Sears, "Laser Additive Manufacturing for Improved Wear and Performance", Advances in Powder Metallurgy & Particulate Materials, Metal Powder Industries Federation, Princeton, NJ, US, vol. 8, pp. 27-34 (2009).

* cited by examiner

COBALT BASED ALLOY ADDITIVE MANUFACTURED ARTICLE, COBALT BASED ALLOY PRODUCT, AND METHOD FOR MANUFACTURING SAME

CLAIM OF PRIORITY

The present application claims priority from Japanese patent application serial no. 2017-172999 filed on Sep. 8, 2017, the content of which is hereby incorporated by reference into this application.

FIELD OF THE INVENTION

The present invention relates to cobalt based alloy articles having excellent mechanical properties and, in particular, to a cobalt based alloy additive manufactured article, a cobalt based alloy product based on the article, and a method for manufacturing the article and the product.

DESCRIPTION OF RELATED ART

Cobalt (Co) based alloy articles, along with nickel (Ni) based alloy articles, are representative heat resistant alloy materials. Also referred to as super alloys, they are widely used for high temperature members of turbines (e.g. gas turbines, steam turbines, etc.). Although Co based alloy articles are higher in material costs than Ni based alloy articles, they have been used for applications such as turbine stator blades and combustor members because of their excellence in corrosion resistance and abrasion resistance, and their ease of solid solution strengthening.

In Ni based alloy materials, various improvements that have been made so far in composition and manufacturing processes of heat resistant alloy materials have led to the development of strengthening through γ' phase (e.g. Ni$_3$(Al, Ti) phase) precipitation, which has now become mainstream. On the other hand, in Co based alloy materials, an intermetallic compound phase that contributes to improving mechanical properties, like the γ' phase in Ni based alloy materials, hardly precipitates, which has prompted research on carbide phase precipitation strengthening.

For example, JP Shou 61 (1986)-243143 A discloses a Co based superplastic alloy made up of a Co based alloy matrix having a crystal grain size of equal to or less than 10 μm and carbide grains in a granular form or a particulate form having a grain size of 0.5 to 10 μm precipitated in the matrix. The Co based alloy includes 0.15 to 1 wt. % of C, 15 to 40 wt. % of Cr, 3 to 15 wt. % of W or Mo, 1 wt. % or less of B, 0 to 20 wt. % of Ni, 0 to 1.0 wt. % of Nb, 0 to 1.0 wt. % of Zr, 0 to 1.0 wt. % of Ta, 0 to 3 wt. % of Ti, 0 to 3 wt. % of Al, and the balance of Co. According to JP Shou 61 (1986)-243143 A, there can be provided a Co based superplastic alloy that exhibits superplasticity accompanying with an elongation of equal to or more than 70% even in a low temperature range (e.g. at 950° C.), and is capable of being formed into an article with a complicated shape by plastic working such as forging.

JP Hei 7 (1995)-179967 A discloses a Co based alloy that is excellent in corrosion resistance, abrasion resistance, and high temperature strength. The alloy includes 21 to 29 wt. % of Cr, 15 to 24 wt. % of Mo, 0.5 to 2 wt. % of B, 0.1 or more and less than 0.5 wt. % of Si, more than 1 and equal to or less than 2 wt. % of C, 2 wt. % or less of Fe, 2 wt. % or less of Ni, and the balance of substantially Co. According to JP Hei 7 (1995)-179967 A, the Co based alloy has a composite structure in which a molybdenum boride and a chromium carbide are relatively finely dispersed in a quaternary alloy phase of Co, Cr, Mo and Si and exhibits excellent corrosion resistance, abrasion resistance, and high strength.

Meanwhile, in recent years, three dimensional shaping technology (the so-called 3D printing) such as additive manufacturing or AM has received much attention as a technique for manufacturing finished products with a complicated shape by near net shaping. To apply the three dimensional shaping technology to heat resistant alloy components, vigorous research and development activities are currently being carried out.

For example, JP 2016-535169 A (WO 2015/073081 A1) discloses a method of producing layers including the steps of: (a) providing a source of a granular composite powder having a porosity of 20% or less; (b) depositing a first portion of said powder onto a target surface; (c) depositing energy into the powder of said first portion under conditions that said energy causes sintering, fusing or melting of the first powder portion so as to create a first layer; (d) depositing a second portion of powder onto said first layer; and (e) depositing energy into the powder of said second portion under conditions that said energy causes sintering, fusing or melting of the second powder portion so as to create a second layer. In the method, the energy is supplied by a laser positioned on said first layer.

JP 2016-535169 A (WO 2015/073081 A1) teaches as follows: Selective laser melting (SLM) or direct metal laser melting (DMLM) uses laser to make a material a full melt. Full melting is typically useful for a monomaterial (e.g. pure titanium or a single alloy such as Ti-6Al-4V), as there is just one melting point. By contrast, selective laser sintering (SLS) and direct metal laser sintering (DMLS) are essentially the same thing, and SLS/DMLS is used to apply processes to a variety of materials—multiple metals, alloys, or combinations of alloys and other materials such as plastics, ceramics, polymers, carbides or glasses. Meanwhile, sintering is apart from melting, and a sintering process does not fully melt a material but heats it to the point that the material can fuse together on a molecular level.

Since the 3D printing is capable of directly forming even components of complicated shape, manufacturing of turbine high temperature components by the 3D printing is very attractive in terms of reduction of manufacturing work time and improvement of manufacturing yield (i.e. reduction of manufacturing cost).

Co based alloy materials such as the ones disclosed in JP Show 61 (1986)-243143 A and JP Hei 7 (1995)-179967 A are thought to have mechanical properties superior to those of previous Co based alloy materials. Unfortunately, however, their mechanical properties are inferior to those of precipitation-strengthened Ni based alloy materials of recent years. Therefore, many studies on additive manufacturing articles (AM articles) for use as turbine high temperature components are currently directed toward precipitation-strengthened Ni based alloy materials.

However, AM articles of the precipitation-strengthened Ni based alloys are prone to have problems such as generation of the γ' phase, which is the core of their mechanical properties, being hindered and internal defects occurring in the finished products. As a result, expected mechanical properties have not been sufficiently achieved. This is attributable to the fact that current precipitation-strengthened Ni based alloy materials used for turbine high temperature components have been optimized through melting and forging processes under high vacuum, and therefore oxidation and nitriding of the Al component and the Ti component, which constitute the γ' phase, easily occur at the stages of preparing alloy powder for AM and performing AM.

On the other hand, manufacturing the Co based alloy materials such as the ones disclosed in JP show 61 (1986)-243143 A and JP Hei 7 (1995)-179967 A does not require precipitation of an intermetallic compound phase such as the γ' phase as in Ni based alloy materials, so Co based alloy materials do not contain plenty of Al or Ti, which is easily oxidized. This means melting and forging processes in the air atmosphere are available for their manufacturing. Therefore, such Co based alloy materials are considered to be advantageous in manufacturing of alloy powder for AM and manufacturing of AM articles. Also, the Co based alloy materials have advantages with corrosion resistance and abrasion resistance comparable to or superior to those of Ni based alloy materials.

However, as mentioned above, conventional Co based alloy materials have disadvantages of mechanical properties inferior to those of γ' phase precipitation-strengthened Ni based alloy materials. In other words, if a Co based alloy material could achieve mechanical properties comparable to or superior to those of γ' phase precipitation-strengthened Ni based alloy materials (e.g. a creep temperature endurable for 100,000 hours at a stress of 58 MPa being equal to or higher than 875° C., a tensile strength being equal to or more than 500 MPa at room temperature, etc.), AM articles of the Co based alloy material would become highly attractive turbine high temperature components.

SUMMARY OF THE INVENTION

The present invention was made in view of the foregoing and has an objective to provide an additive manufactured article of a Co based alloy material having mechanical properties comparable to or superior to those of precipitation-strengthened Ni based alloy materials, and a Co based alloy product based on the additive manufacturing article. Also, another objective is to provide a method for manufacturing the Co based alloy additive manufactured article and the Co based alloy product.

(I) According to one aspect of the present invention, there is provided an additive manufactured article formed of a cobalt based alloy. The cobalt based alloy has a chemical composition including: 0.08 to 0.25 mass % of carbon (C); 0.1 mass % or less of boron (B); 10 to 30 mass % of chromium (Cr); 30 mass % or less in total of iron (Fe) and nickel (Ni), the Fe being in an amount of 5 mass % or less; 5 to 12 mass % in total of tungsten (W) and/or molybdenum (Mo); 0.5 to 2 mass % in total of titanium (Ti), zirconium (Zr), niobium (Nb) and tantalum (Ta); 0.5 mass % or less of silicon (Si); 0.5 mass % or less of manganese (Mn); 0.003 to 0.04 mass % of nitrogen (N); and the balance being cobalt (Co) and impurities. The additive manufactured article is a polycrystalline body comprising crystal grains with an average crystal grain size of 10 to 100 μm. In the crystal grains of the polycrystalline body, segregation cells with an average size of 0.15 to 1.5 μm are formed, in which components constituting an MC type carbide phase comprising the Ti, Zr, Nb and/or Ta are segregated in boundary regions of the segregation cells, and/or grains of the MC type carbide phase are precipitated at an average intergrain distance of 0.15 to 1.5 μm.

In the above Co based alloy additive manufactured article (I) of the invention, the following changes and modifications can be made.

(i) The chemical composition of the Co based alloy may include 0.01 to 1 mass % of the Ti, 0.05 to 1.5 mass % of the Zr, 0.02 to 1 mass % of the Nb, and 0.05 to 1.5 mass % of the Ta; and (ii) The chemical composition of the Co based alloy may include, as the impurities, 0.5 mass % or less of aluminum (Al) and 0.04 mass % or less of oxygen (O).

(II) According to another aspect of the invention, there is provided a product formed of a Co based alloy, the Co based alloy having a chemical composition including: 0.08 to 0.25 mass % of C; 0.1 mass % or less of B; 10 to 30 mass % of Cr; 30 mass % or less in total of Fe and Ni, the Fe being in an amount of 5 mass % or less; 5 to 12 mass % in total of W and/or Mo; 0.5 to 2 mass % in total of Ti, Zr, Nb and Ta; 0.5 mass % or less of Si; 0.5 mass % or less of Mn; 0.003 to 0.04 mass % of N; and the balance being Co and impurities. The product is a polycrystalline body comprising crystal grains with an average crystal grain size of 20 to 145 μm. In the crystal grains of the polycrystalline body of product, grains of an MC type carbide phase comprising the Ti, Zr, Nb and/or Ta are precipitated at an average intergrain distance of 0.15 to 1.5 μm.

In the above Co based alloy product (II) of the invention, the following changes and modifications can be made.

(iii) The product may exhibit a 0.2% proof stress of 500 MPa or more at room temperature and a creep temperature endurable for 100,000 hours at a stress of 58 MPa being 875° C. or higher;

(iv) The chemical composition of the Co based alloy may include 0.01 to 1 mass % of the Ti, 0.05 to 1.5 mass % of the Zr, 0.02 to 1 mass % of the Nb, and 0.05 to 1.5 mass % of the Ta;

(v) The chemical composition of the Co based alloy may include, as the impurities, 0.5 mass % or less of Al and 0.04 mass % or less of O;

(vi) The product may be a turbine high temperature component; and (vii) The turbine high temperature component may be a turbine stator blade or a combustor nozzle.

(III) According to still another aspect of the invention, there is provided a method for manufacturing the above Co based alloy additive manufactured article. The manufacturing method includes: an alloy powder preparation step of preparing a Co based alloy powder having the chemical composition, the Co based alloy powder having a predetermined particle size; and a selective laser melting step of forming an additive manufactured article, the step comprising alternate repetition of an alloy powder bed preparation substep of laying the Co based alloy powder such that it forms an alloy powder bed having a predetermined thickness and a laser melting solidification substep of irradiating a predetermined region of the alloy powder bed with a laser beam to locally melt and rapidly solidify the Co based alloy powder in the region, the laser beam having a predetermined output power and a predetermined scanning speed. The predetermined thickness of the alloy powder bed h (unit: μm), the predetermined output power of the laser beam P (unit: W), and the predetermined scanning speed of the laser beam S (unit: mm/s) are controlled to satisfy the following formulas: "15<h<150" and "67×(P/S)−3.5<h<2222× (P/S)+13".

In the above manufacturing method of the Co based alloy additive manufactured article (III) of the invention, the following changes and modifications can be made.

(viii) The alloy powder preparation step may include an alloy powder classification substep of regulating the particle size of the Co based alloy powder to 5 to 100 μm.

(IV) According to still another aspect of the invention, there is provided a method for manufacturing the above Co based alloy product. The manufacturing method includes: an alloy powder preparation step of preparing a cobalt based alloy powder having the chemical composition, the cobalt based alloy powder having a predetermined particle size; a selective laser melting step of forming an additive manufactured article, the step comprising alternate repetition of an alloy powder bed preparation substep of laying the Co based alloy powder such that it forms an alloy powder bed having a predetermined thickness and a laser melting solidification substep of irradiating a predetermined region of the alloy powder bed with a laser beam to locally melt and rapidly solidify the Co based alloy powder in the region, the laser beam having a predetermined output power and a predetermined scanning speed; and a solution heat treatment step of subjecting the additive manufactured article to a solution treatment at temperatures ranging from 1,100 to 1,200° C. with a holding duration of 0.5 to 10 hours. The predetermined thickness of the alloy powder bed h (unit: μm), the predetermined output power of the laser beam P (unit: W), and the predetermined scanning speed of the laser beam S (unit: mm/s) are controlled to satisfy the following formulas: "15<h<150" and "67× (P/S)−3.5<h<2222× (P/S)+13".

In the above manufacturing method of the Co based alloy product (IV) of the invention, the following changes and modifications can be made.

(ix) The alloy powder preparation step may include an alloy powder classification substep of regulating the particle size of the cobalt based alloy powder to 5 to 100 μm; and (x) The manufacturing method may further include an aging heat treatment step of subjecting the additive manufactured article to an aging treatment at temperatures ranging from 750 to 1,000° C. with a holding duration of 0.5 to 10 hours after the solution heat treatment step.

Advantages of the Invention

According to the present invention, there can be provided an additive manufactured article of a Co based alloy material having mechanical properties comparable to or superior to those of precipitation-strengthened Ni based alloy materials, a Co based alloy product based on the additive manufacturing article, and a method for manufacturing the Co based alloy additive manufactured article and the Co based alloy product.

DETAILED DESCRIPTION OF THE PREFERRED EMBODIMENTS

Basic Concept of the Present Invention

As mentioned before, various research and development activities have been carried out on strengthening of Co based alloy materials through carbide phase precipitation. Carbide phases that contribute to precipitation strengthening include MC type carbide phases of Ti, Zr, Nb and Ta, and complex carbide phases of these metallic elements.

The C component, which is indispensable in formation of a carbide phase with each of Ti, Zr, Nb and Ta, tends to segregate significantly at final solidification portions (e.g. dendrite boundaries, crystal grain boundaries, etc.) at the melting and solidification stages of the Co based alloy. So, in conventional Co based alloy materials, the carbide phase grains precipitate along the dendrite boundaries and crystal grain boundaries in the matrix. In a general cast material of a Co based alloy, for example, the average spacing between dendrite boundaries and the average crystal grain size are on the order of $10^1$ to $10^2$ μm, and therefore the average spacing between carbide phase grains is also on the order of $10^1$ to $10^2$ μm. Furthermore, even with the relatively fast solidification rate of laser welding, for example, the average spacing between carbide phase grains at the solidified portions is around 5 μm.

Precipitation strengthening in alloys is generally known to be inversely proportional to the average spacing between precipitates, and it is considered that precipitation strengthening is effective only when the average spacing between precipitates is around 2 μm or less. However, with the above-mentioned conventional technology, the average spacing between precipitates has not reached this level in a Co based alloy material, and sufficient precipitation strengthening effect has not been achieved. In other words, with the conventional technology, it has been difficult to finely and dispersedly precipitate carbide phase grains that might contribute to strengthening alloys. This would be the main factor behind the fact that Co based alloy materials have been said to have mechanical properties inferior to those of precipitation-strengthened Ni based alloy materials.

Meanwhile, another carbide phase that can precipitate in Co based alloys is the Cr carbide phase. Since the Cr component is highly solid soluble to the Co based alloy matrix and hardly segregate, the Cr carbide phase can be dispersedly precipitated in the matrix crystal grains. However, the Cr carbide phase is poor in lattice matching with the Co based alloy matrix crystals and is known to be not so effective as a precipitation-strengthening phase.

The present inventors thought that if they were able to dispersedly precipitate carbide phase grains contributing to precipitation strengthening in the matrix crystal grains, they would be able to dramatically improve mechanical properties of Co based alloy materials. Considering the inherent excellent corrosion resistance and abrasion resistance of Co based alloy materials, they would be able to provide a heat-resistant alloy material that would surpass precipitation-strengthened Ni based alloy materials.

In order to obtain such a Co based alloy material, the inventors conducted intensive research on alloy compositions and manufacturing methods. As a result, they have found that it is possible to dispersedly precipitate carbide phase grains contributing to alloy strengthening in the matrix crystal grains of a Co based alloy material by optimizing the alloy composition and controlling the amount of heat input for local melting and rapid solidification in a manufacturing method including AM (in particular, selective laser melting). The present invention was made based on this finding.

Preferred embodiments of the present invention will be hereinafter described with reference to the accompanying drawings. However, the invention is not limited to the specific embodiments described below, and various combinations with known art and modifications based on known art are possible without departing from the spirit and the scope of the invention.

[Method for Manufacturing Co Based Alloy Additive Manufacturing Article/Co Based Alloy Product]

Figure 1:
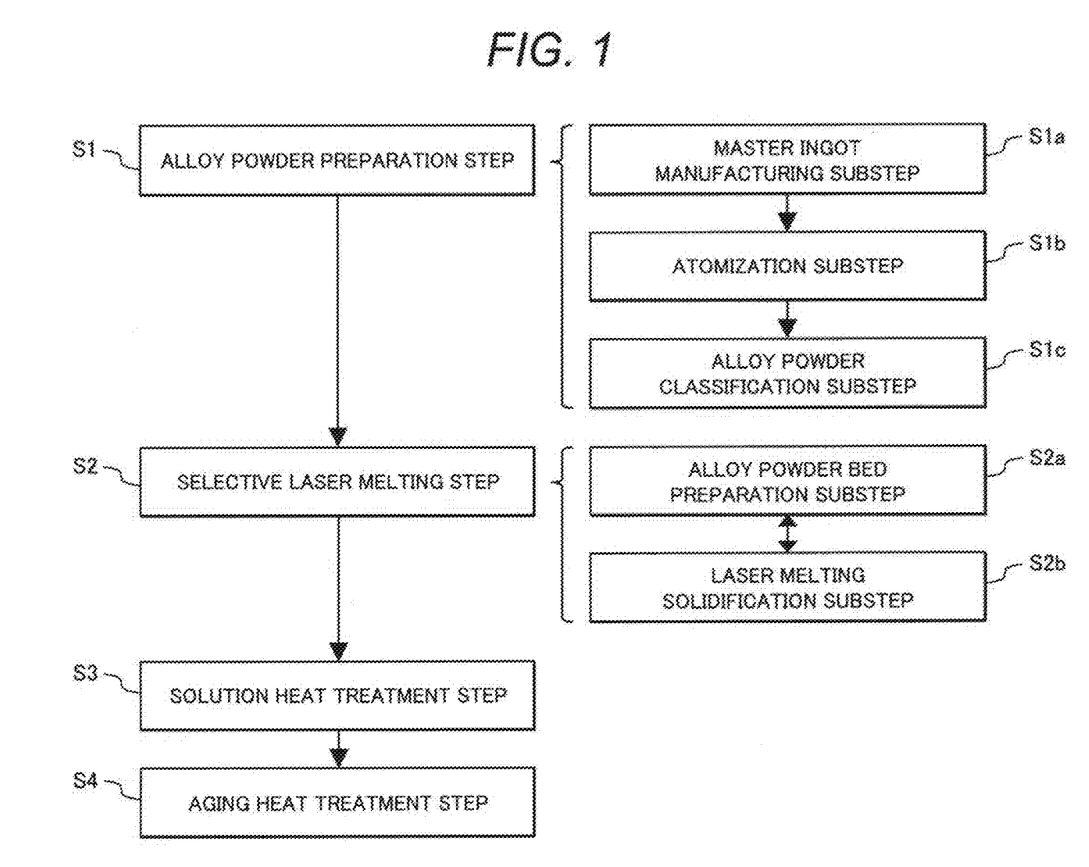
FIG. 1 is a flow diagram showing an exemplary process of a method for manufacturing a Co based alloy product according to an embodiment of the present invention.

FIG. 1 is a flow diagram showing an exemplary process of a method for manufacturing a Co based alloy product according to an embodiment of the invention. As shown in FIG. 1, the method for manufacturing a Co based alloy product roughly includes: an alloy powder preparation step S1 of preparing a Co based alloy powder; a selective laser melting step S2 of forming the prepared Co based alloy powder into an AM article with a desired shape; a solution heat treatment step S3 of subjecting the formed AM article to a solution treatment; and an aging heat treatment step S4 of subjecting the solution heat-treated AM article to an aging treatment. The AM article obtained by the selective laser melting step S2 is a Co based alloy additive manufactured article according to an embodiment of the invention.

Each step will be hereinafter described in more detail.

(Alloy Powder Preparation Step)

In the step S1, a Co based alloy powder having a predetermined chemical composition is prepared. The chemical composition preferably includes: 0.08 to 0.25 mass % of C; 0.1 mass % or less of B; 10 to 30 mass % of Cr; 30 mass % or less in total of Fe and Ni with Fe being in an amount of 5 mass % or less; 5 to 12 mass % in total of W and/or Mo; 0.5 to 2 mass % in total of Ti, Zr, Nb and Ta; 0.5 mass % or less of Si; 0.5 mass % or less of Mn; 0.003 to 0.04 mass % of N; and the balance being Co and impurities.

C: 0.08 to 0.25 mass %

The Co component is an important component that constitutes an MC type carbide phase to serve as a precipitation strengthening phase (this MC type carbide phase may be referred to as "carbide phase of Ti, Zr, Nb and/or Ta or "reinforcing carbide phase"). The content of the C component is preferably 0.08 to 0.25 mass %, more preferably 0.1 to 0.2 mass %, and even more preferably 0.12 to 0.18 mass %. When the C content is less than 0.08 mass %, the amount of precipitation of the reinforcing carbide phase is insufficient, resulting in an insufficient effect of improving the mechanical properties. By contrast, when the C content is over 0.25 mass %, the alloy material becomes excessively hard, which leads to deteriorated ductility and toughness.

B: 0.1 mass % or less

The B component contributes to improving bondability between crystal grain boundaries (the so-called grain boundary strengthening). Although the B is not an essential component, when it is contained in the alloy, the content of the B component is preferably 0.1 mass % or less and more preferably 0.005 to 0.05 mass %. When the B component is over 0.1 mass %, cracking (e.g. solidification cracking) is prone to occur during formation of the AM article.

Cr: 10 to 30 mass %

The Cr component contributes to improving corrosion resistance and oxidation resistance. The content of the Cr component is preferably 10 to 30 mass % and more preferably 10 to 25 mass %. In the case where a corrosion resistant coating layer is provided on the outermost surface of the Co based alloy product, the content of the Cr component is even more preferably 10 to 18 mass %. When the Cr content is less than 10 mass %, the corrosion resistance and the oxidation resistance are insufficient. Meanwhile, when the Cr content is over 30 mass %, the brittle a phase and/or the excessive amount of Cr carbide phase are generated, resulting in deteriorated mechanical properties (i.e. toughness, ductility, strength, etc.).

Ni: 30 mass % or less

Being similar to Co component in properties but less expensive than Co, the Ni component may be used to replace part of the Co component. Although the Ni is not an essential component, when it is contained in the alloy, the content of the Ni component is preferably 30 mass % or less, more preferably 20 mass % or less, and more preferably 5 to 15 mass %. When the Ni content is over 30 mass %, the abrasion resistance and the local stress resistance, which are characteristics of Co based alloys, deteriorate. This is attributable to the difference in stacking fault energy between Co and Ni.

Fe: 5 mass % or less

Being much less expensive than Ni and similar to Ni component in properties, the Fe component may be used to replace part of the Ni component. The total content of the Fe and Ni is preferably 30 mass % or less, more preferably 20 mass % or less, and even more preferably 5 to 15 mass %. Although the Fe is not an essential component, when it is contained in the alloy, the content of the Fe component is preferably 5 mass % or less and more preferably 3 mass % or less. When the Fe content is over 5 mass %, the corrosion resistance and mechanical properties deteriorate.

W and/or Mo: 5 to 12 mass % in total

The W component and the Mo component contribute to solution-strengthening the matrix. The total content of the W component and/or the Mo component is preferably 5 to 12 mass % and more preferably 7 to 10 mass %. When the total content of the W component and the Mo component is less than 5 mass %, the solution strengthening of the matrix is insufficient. In contrast, when the total content of the W component and the Mo component is over 12 mass %, the brittle a phase tends to be generated easily, resulting in deteriorated mechanical properties (i.e. toughness, ductility, etc.).

Re: 2 mass % or less

The Re component contributes to solution-strengthening the matrix and improving corrosion resistance. Although the Re is not an essential component, when it is contained in the alloy to replace part of the W component or the Mo component, the content of the Re component is preferably 2 mass % or less and more preferably 0.5 to 1.5 mass %. When the Re content is over 2 mass %, the functions and effects of the Re component become saturated, and the material costs become too high.

Ti, Zr, Nb, and Ta: 0.5 to 2 mass % in total

The Ti component, the Zr component, the Nb component, and the Ta component are important components that constitute the reinforcing carbide phase (MC type carbide phase). The total content of the Ti, Zr, Nb and Ta components is preferably 0.5 to 2 mass % and more preferably 0.5 to 1.8 mass %. When the total content is less than 0.5 mass %, the amount of precipitation of the reinforcing carbide phase is insufficient, and, as a result, the effect of improving the mechanical properties is insufficient. By contrast, when the total content is over 2 mass %, the mechanical properties deteriorate due to coarsening of the grains of the reinforcing carbide phase, accelerated generation of a brittle phase (e.g. a phase), generation of grains of an oxide phase that does not contribute to precipitation strengthening, etc.

More specifically, the Ti content is preferably 0.01 to 1 mass % and more preferably 0.05 to 0.8 mass %. The Zr content is preferably 0.05 to 1.5 mass % and more preferably 0.1 to 1.2 mass %. The Nb content is preferably 0.02 to 1 mass % and more preferably 0.05 to 0.8 mass %. The Ta content is preferably 0.05 to 1.5 mass % and more preferably 0.1 to 1.2 mass %.

Si: 0.5 mass % or less

The Si component serves as a deoxidant agent and contributes to improving the mechanical properties. Although the Si is not an essential component, when it is contained in the alloy, the content of the Si component is preferably 0.5 mass % or less and more preferably 0.01 to 0.3 mass %. When the Si content is over 0.5 mass %, coarse grains of an oxide (e.g. $SiO_2$) are generated, which causes deterioration of the mechanical properties.

Mn: 0.5 mass % or less

The Mn component serves as a deoxidant agent and a desulfurizing agent and contributes to improving the mechanical properties and the corrosion resistance. Although the Mn is not an essential component, when it is contained in the alloy, the content of the Mn component is preferably 0.5 mass % or less and more preferably 0.01 to 0.3 mass %. When the Mn content is over 0.5 mass %, coarse grains of a sulfide (e.g. MnS) are generated, which causes deterioration of the mechanical properties and the corrosion resistance.

N: 0.003 to 0.04 mass %

The N component contributes to stabilizing the generation of the reinforcing carbide phase. The content of the N component is preferably 0.003 to 0.04 mass %, more preferably 0.005 to 0.03 mass %, and even more preferably 0.007 to 0.025 mass %. When the N content is less than 0.003 mass %, the functions and effects of the N component are insufficient. Meanwhile, when the N content is over 0.04 mass %, coarse grains of a nitride (e.g. Cr nitride) are generated, which causes deterioration of the mechanical properties.

Balance: Co component and Impurities

The Co component is one of the key components of the alloy and its content is the largest of all the components. As mentioned above, Co based alloy materials have the advantages of having corrosion resistance and abrasion resistance comparable to or superior to those of Ni based alloy materials.

The Al component is one of the impurities of the alloy and is not to be intentionally included in the alloy. However, an Al content of 0.3 mass % or less is acceptable as it does not have any serious negative influence on the mechanical properties of the Co based alloy product. When the Al content is over 0.3 mass %, coarse grains of an oxide or nitride (e.g. $Al_2O_3$ or AlN) are generated, which causes deterioration of the mechanical properties.

The O component is also one of the impurities of the alloy and is not to be intentionally included in the alloy. However, an O content of 0.04 mass % or less is acceptable as it does not have any serious negative influence on the mechanical properties of the Co based alloy product. When the O content is over 0.04 mass %, coarse grains of each oxide (e.g. Ti oxide, Zr oxide, Al oxide, Fe oxide, Si oxide, etc.) are generated, which causes deterioration of the mechanical properties.

In this step S1, there is no particular limitation on the method and techniques for preparing the Co based alloy powder, and any conventional method and technique may be used. For example, a master ingot manufacturing substep S1a of manufacturing a master ingot by mixing, melting, and casting the raw materials such that the ingot has a desired chemical composition and an atomization substep S1b of forming the alloy powder from the master ingot may be performed. Also, there is no particular limitation on the atomization method, and any conventional method and technique may be used. For example, gas atomizing or centrifugal force atomizing, by which spherical particles of high purity and homogeneous composition can be obtained, may be preferably used.

For ease of handling and ease of filling the alloy powder bed in the following selective laser melting step S2, the particle size of the alloy powder is preferably 5 to 100 μm, more preferably 10 to 70 μm, and even more preferably 10 to 50 μm. When the particle size of the alloy powder is less than 5 μm, fluidity of the alloy powder decreases in the following step S2 (i.e. formability of the alloy powder bed decreases), which causes deterioration of shape accuracy of the AM article. In contrast, when the particle size of the alloy powder is over 100 μm, controlling the local melting and rapid solidification of the alloy powder bed in the following step S2 becomes difficult, which leads to insufficient melting of the alloy powder and increased surface roughness of the AM article.

In view of the above, an alloy powder classification substep S1c is preferably performed so as to regulate the alloy powder particle size to 5 to 100 μm. In the present invention, when the particle size distribution of the alloy powder manufactured in the atomization substep S1b is observed to fall within the desired range, it is assumed that the substep S1c has been performed.

(Selective Laser Melting Step)

In the step S2, the prepared Co based alloy powder is formed into an AM article having a desired shape by selective laser melting (SLM). More specifically, this step comprises alternate repetition of an alloy powder bed preparation substep S2a and a laser melting solidification substep S2b. In the step S2a, the Co based alloy powder is laid such that it forms an alloy powder bed having a predetermined thickness, and in the step S2b, a predetermined region of the alloy powder bed is irradiated with a laser beam to locally melt and rapidly solidify the Co based alloy powder in the region.

In this step S2, in order to obtain a finished Co based alloy product having a desired microstructure (a microstructure in which the reinforcing carbide phase grains are dispersedly precipitated in the matrix crystal grains), the microstructure of the AM article, which is a precursor of the finished product, is controlled by controlling the local melting and the rapid solidification of the alloy powder bed.

More specifically, the thickness of the alloy powder bed h (unit: μm), the output power of the laser beam P (unit: W), and the scanning speed of the laser beam S (unit: mm/s) are preferably controlled to satisfy the following formulas: "$15<h<150$" and "$67 \times (P/S) - 3.5 < h < 2222 \times (P/S) + 13$". When these formulas are not satisfied, an AM article having a desired microstructure cannot be obtained. This step S2 makes it possible to obtain a Co based alloy AM article according to an embodiment of the invention.

While the output power P and the scanning speed S of the laser beam basically depend on configurations of the laser apparatus, they may be determined so as to satisfy the following formulas: "$10 \leq P \leq 1000$" and "$10 \leq S \leq 7000$".

(Co Based Alloy Additive Manufactured Article)

Figure 2:
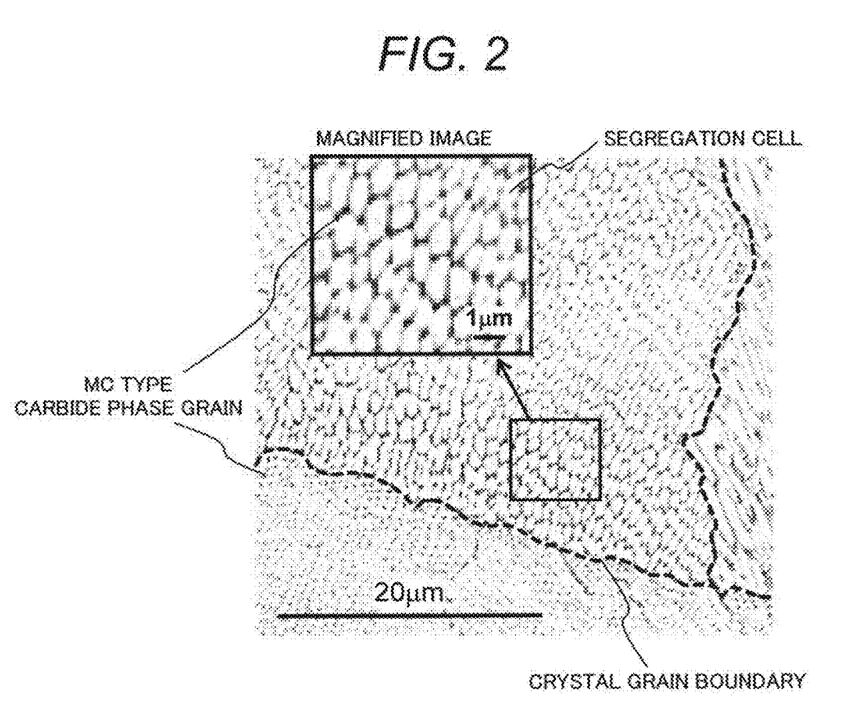
FIG. 2 is an example of a scanning electron microscope (SEM) image of a Co based alloy AM article according to an embodiment of the invention.

FIG. 2 is an example of a scanning electron microscope (SEM) image of a Co based alloy AM article according to an embodiment of the invention. As shown in FIG. 2, the Co based alloy AM article according to the embodiment of the invention has a unique microstructure that has never been seen before.

The AM article is a polycrystalline body with an average crystal grain size of 10 to 100 µm. In the crystal grains of the polycrystalline body, segregation cells (also capable of being referred to segregation microcells) with an average size of 0.15 to 1.5 µm are formed. Also, grains of the reinforcing carbide phase are precipitated at an average spacing of 0.15 to 1.5 µm. In the present invention, the size of segregation cells is defined as the average of the long diameter and the short diameter.

A more detailed microstructure observation by transmission electron microscopy-energy dispersive X-ray spectrometry (TEM-EDX) has revealed that the components constituting the reinforcing carbide phase (Ti, Zr, Nb, Ta, and C) segregate in the boundary regions between the neighboring segregation cells (i.e. in outer peripheral regions of microcells, similar to cell walls). It has also been observed that grains of the reinforcing carbide phase are precipitated at part of the triple points/quadruple points in the boundary regions among these segregation cells.

(Solution Heat Treatment Step)

In the step S3, the formed Co based alloy AM article is subjected to a solution treatment. The heat treatment is preferably performed at temperatures ranging from 1,100 to 1,200° C. with a holding duration of 0.5 to 10 hours. There is no particular limitation on a cooling method after the heat treatment, and oil cooling, water cooling, air cooling, or furnace cooling may be used.

This solution treatment allows the crystal grains of the matrix of the AM article to recrystallize, thereby reducing the internal strain in the matrix crystal grains of the AM article that has occurred during rapid cooling solidification. It is preferable that the average crystal grain size of the matrix crystal grains be controlled to 20 to 145 µm. When the average crystal grain size is less than 20 µm or over 145 µm, the finished Co based alloy product does not exhibit sufficient creep properties.

In addition, interestingly enough, it has been found that as the matrix crystal grains recrystallize, the components segregated in the boundary regions of the segregation cells start to aggregate to form the reinforcing carbide phase, and as a result, the segregation cells disappear (more specifically, they become unobservable by scanning electron microscopy, or SEM). The aggregation points where they begin to form the reinforcing carbide phase are thought to be at triple points and quadruple points of the former segregation cell boundaries, which causes the fine dispersion of the reinforcing carbide phase throughout the matrix crystal grains (within each crystal grain and on the crystal grain boundaries).

By successfully controlling the temperature and the holding duration of the solution heat treatment, the reinforcing carbide phase beginning to form can be grown into grain form without being aggregated/coarsened excessively. In such a case, the Co based alloy product obtained through this step S3 may be considered to be a finished product. However, in terms of preventing from the excessive coarsening of the matrix crystal grains (in other words, in terms of manufacturing stability and yield), it is more preferable that the following aging heat treatment step S4 be performed.

(Aging Heat Treatment Step)

In the step S4, the solution-treated Co alloy AM articles is subjected to an aging treatment. The aging treatment is preferably performed at temperatures ranging from 750 to 1000° C. with a holding duration of 0.5 to 10 hours. There is no particular limitation on the cooling method after the heat treatment, and oil cooling, water cooling, air cooling, or furnace cooling may be used.

The aging treatment allows the reinforcing carbide phase beginning to form in the solution heat treatment step S3 to grow into grain form while controlling excessive coarsening of the matrix crystal grains. The Co based alloy product thus obtained has an average matrix crystal grain size of 20 to 145 µm and includes grains of the reinforcing carbide phase finely and dispersedly precipitated in each crystal grain at an average intergrain distance of 0.15 to 1.5 µm. Naturally enough, grains of the reinforcing carbide phase are dispersedly precipitated also on the matrix crystal grain boundaries in the Co based alloy product according to the embodiment of the invention.

(Finishing Step)

Where appropriate, other steps such as a step of forming a corrosion resistant coating layer and a surface finishing step, not shown in FIG. 1, may be further performed on the Co based alloy product obtained through the solution heat treatment step S3 or the aging heat treatment step S4.

[Co Based Alloy Product]

Figure 3:
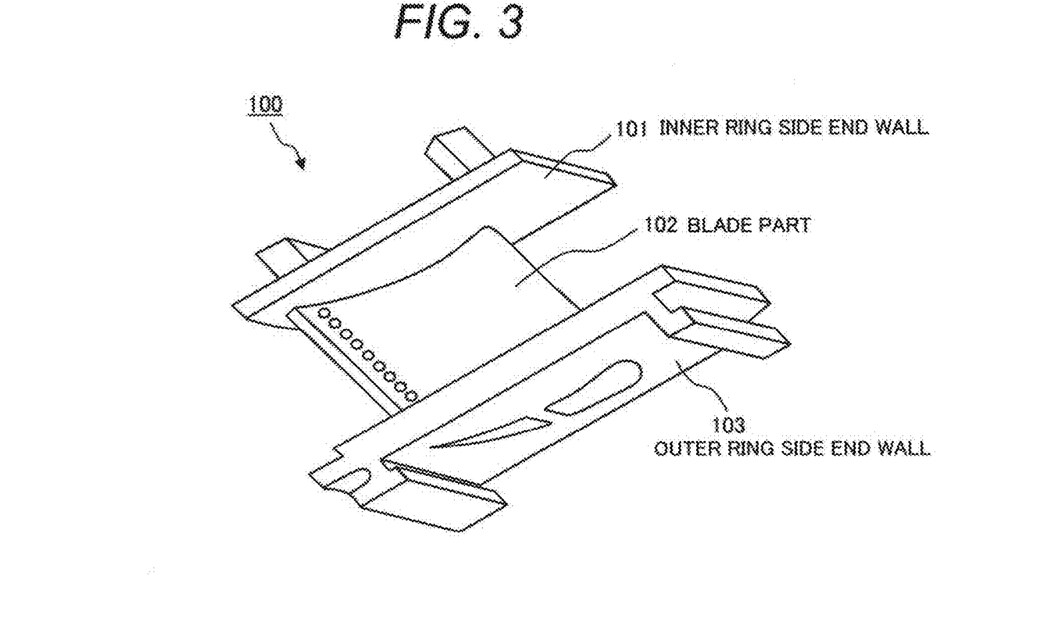
FIG. 3 is a schematic illustration of a perspective view showing a turbine stator blade which is a Co based alloy product as a turbine high temperature component according to an embodiment of the invention.

FIG. 3 is a schematic illustration of a perspective view showing a turbine stator blade which is a Co based alloy product as a turbine high temperature component according to an embodiment of the invention. As shown in FIG. 3, the turbine stator blade 100 includes an inner ring side end wall 101, a blade part 102, and an outer ring side end wall 103. Inside the blade part 102 is often formed a cooling structure. As seen from FIG. 3, since the turbine stator blade 100 has a very complicated shape and structure, the technical significance of AM articles manufactured by near net shaping and alloy products based on such AM articles is profound.

Meanwhile, in the case of a gas turbine for power generation with an output of around 30 MW, the length of the blade part 102 of the turbine stator blade 100 (i.e. distance between the end walls 101 and 103) is approximately 170 mm.

Figure 4:
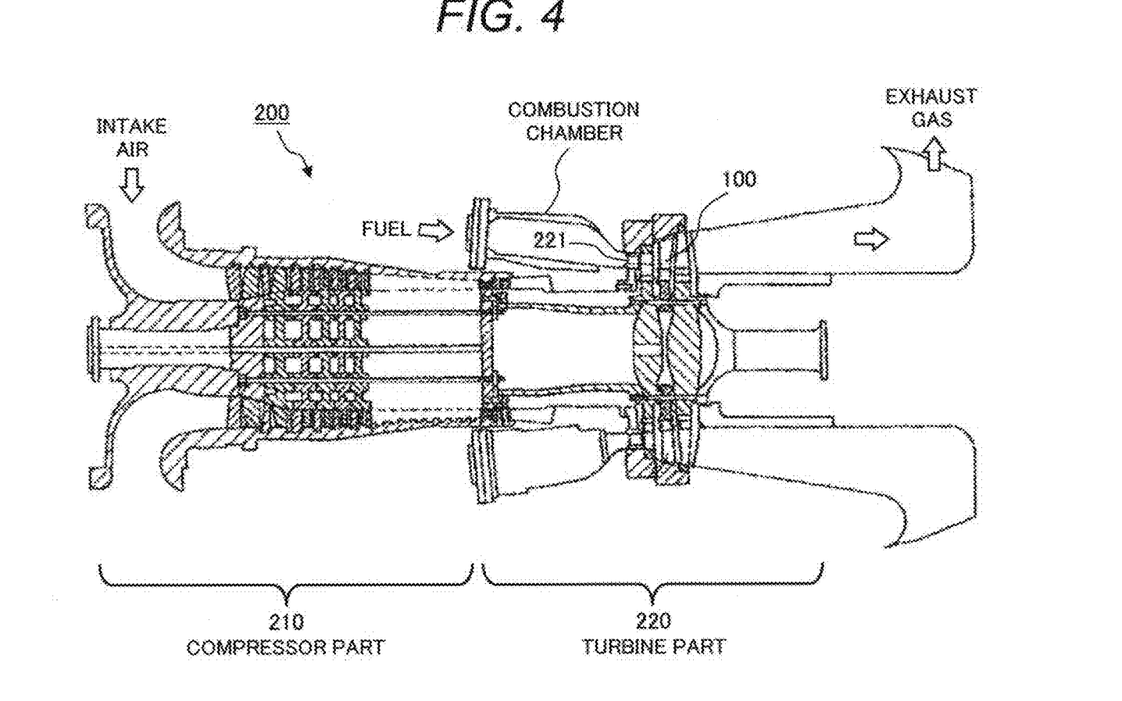
FIG. 4 is a schematic illustration of a cross-sectional view showing a gas turbine equipped with a Co based alloy product according to an embodiment of the invention.

FIG. 4 is a schematic illustration of a cross-sectional view showing a gas turbine equipped with a Co based alloy product according to an embodiment of the invention. As shown in FIG. 4, the gas turbine 200 roughly includes a compression part 210 for compressing intake air and a turbine part 220 for blowing combustion gas of a fuel on turbine blades to obtain rotation power. The turbine high temperature component according to the embodiment of the invention can be preferably used as a turbine nozzle 221 or the turbine stator blade 100 inside the turbine part 220. Naturally enough, the turbine high temperature component according to the embodiment of the invention is not limited to gas turbine applications but may be used for other turbine applications (e.g. steam turbines).

EXAMPLES

The present invention will be hereinafter described in more detail with examples and comparative examples. It should be noted that the invention is not limited to these examples.

[Experimental 1]

(Preparation of Alloy Powders IA-1 to IA-5 of Inventive Examples and Alloy Powders CA-1 to CA-5 of Comparative Examples)

Co based alloy powders having the chemical compositions shown in Table 1 were prepared (the alloy powder preparation Step S1). More specifically, first, the master ingot manufacturing substep S1a was performed, in which the raw materials were mixed and subjected to melting and casting by a vacuum high frequency induction melting method so as to form a mater ingot (weight: approximately 2 kg) for each powder. Next, the atomization substep S1b was performed to form each alloy powder. In the substep S1b, each master ingot was remelted and subjected to gas atomizing in an argon gas atmosphere.

Then, each alloy powder thus obtained was subjected to the alloy powder classification substep S1c to control the particle size. At this point, each alloy powder was classified into an alloy powder with a particle size of 10 to 25 μm (particle size S) and another alloy powder with a particle size of 100 to 150 μm (particle size L).

Each AM article formed above was subjected to heat treatment at 1,150° C. with a holding duration of 4 hours (the solution heat treatment step S3). Then, each solution heat-treated AM article was subjected to heat treatment at 900° C. with a holding duration of 4 hours (the aging heat treatment step S4) to manufacture an SLM alloy product formed of the powder IA-2 or the powder CA-5.

(Manufacturing of LMD Alloy Product Formed of IA-2 and LMD Alloy Product Formed of CA-5)

An AM article was formed of each of the alloy powders IA-2 and CA-5 with the particle size L prepared in Experimental 1 by laser metal deposition (LMD). Each AM article was subjected to the solution heat treatment step S3 and the aging heat treatment step S4 in a similar manner to the above to manufacture an LMD alloy product formed of the powder IA-2 or another LMD alloy product formed of the powder CA-5. The LMD process was performed with the output power of the laser beam P set at 800 W and the scanning speed of the laser beam S set at 15 mm/s.

Meanwhile, LMD is an AM process to form a deposit in which alloy powder is fed as a laser beam is irradiated.

TABLE 1

Chemical Compositions of Alloy Powders IA-1 to IA-5 of Inventive Examples and Alloy Powders CA-1 to CA-5 of Comparative Examples.

| Alloy Number | Chemical Composition (Mass %) | | | | | | | | | | | | | | | | Ti + Zr + Nb + Ta |
|---|---|---|---|---|---|---|---|---|---|---|---|---|---|---|---|---|---|
| | C | B | Cr | Ni | Fe | W | Ti | Zr | Nb | Ta | Si | Mn | N | Co | Al | O | |
| IA-1 | 0.08 | 0.009 | 24.5 | 9.5 | 0.01 | 7.3 | 0.15 | 0.40 | 0.05 | 0.20 | 0.01 | 0.01 | 0.005 | Bal. | 0.01 | 0.005 | 0.80 |
| IA-2 | 0.16 | 0.011 | 25.5 | 10.5 | 0.90 | 7.7 | 0.30 | 0.60 | 0.15 | 0.40 | 0.30 | 0.20 | 0.025 | Bal. | 0.05 | 0.020 | 1.45 |
| IA-3 | 0.25 | 0.009 | 30.0 | — | — | 5.0 | 0.01 | 0.30 | 0.05 | 0.10 | 0.05 | 0.01 | 0.005 | Bal. | — | 0.005 | 0.46 |
| IA-4 | 0.16 | 0.010 | 25.0 | 10.0 | 0.02 | 7.5 | 0.25 | 0.05 | 0.09 | 0.30 | 0.01 | 0.02 | 0.010 | Bal. | — | 0.010 | 0.69 |
| IA-5 | 0.10 | 0.011 | 10.0 | 29.1 | 0.90 | 12.0 | 0.60 | 0.60 | 0.15 | 0.50 | 0.30 | 0.20 | 0.030 | Bal. | 0.05 | 0.030 | 1.85 |
| CA-1 | 0.35 | 0.009 | 32.0 | 9.5 | 0.01 | 7.3 | 0.15 | 0.40 | 0.05 | 0.50 | 0.01 | 0.01 | 0.005 | Bal. | 0.01 | 0.005 | 1.10 |
| CA-2 | 0.35 | 0.009 | 30.0 | 40.0 | 0.01 | 7.3 | 0.90 | 0.40 | 1.0 | 1.0 | 0.01 | 0.01 | 0.005 | Bal. | 2.20 | 0.005 | 3.30 |
| CA-3 | 0.40 | 0.010 | 29.0 | 10.0 | 0.20 | 7.5 | 0.20 | 0.10 | 0.10 | — | 0.10 | 0.02 | 0.001 | Bal. | — | 0.015 | 0.40 |
| CA-4 | 0.25 | 0.010 | 29.0 | 10.0 | 0.10 | 7.0 | — | — | — | — | — | 0.01 | 0.010 | Bal. | — | 0.010 | 0 |
| CA-5 | 0.11 | 0.002 | 22.0 | 23.0 | 0.01 | 14.0 | 0.01 | 0.01 | — | — | 0.50 | 0.003 | 0.006 | Bal. | 0.01 | 0.008 | 0.02 |

"—" indicates that the element was not intentionally included or not detected.
"Bal." indicates inclusion of impurities other than Al and O.

As shown in Table 1, the alloy powders IA-1 to IA-5 have chemical compositions that satisfy the specifications of the invention. In contrast, the alloy powder CA-1 has a C content and a Cr content that fail to satisfy the specifications of the invention. The alloy powder CA-2 has a C content, an Ni content, and a total content of "Ti+Zr+Nb+Ta" that are out of the specifications of the invention. The alloy powder CA-3 has an N content and a total content of "Ti+Zr+Nb+Ta" that are outside of the specifications of the invention. The alloy powder CA-4 has a total content of "Ti+Zr+Nb+Ta" that fail to satisfy the specifications of the invention. The alloy powder CA-5 has a W content and a total content of "Ti+Zr+Nb+Ta" that are out of the specifications of the invention.

[Experimental 2]

(Manufacturing of SLM Alloy Product Formed of IA-2 and SLM Alloy Product Formed of CA-5)

AM articles (8 mm in diameter×10 mm in height) were formed of the alloy powders IA-2 and CA-5 with the particle size S prepared in Experimental 1 by SLM (the selective laser melting step S2). The thickness of each alloy powder bed h and the output power of the laser beam P were set at 100 μm and 100 W, respectively. The local heat input P/S (unit: W×s/mm=J/mm) was controlled by varying the scanning speed (mm/s) of the laser beam S. Controlling the local heat input corresponds to controlling the cooling rate.

Generally, the local heat input of LMD is larger than that of SLM. In other words, the cooling rate of LMD is slower than that of SLM.

(Manufacturing of Casting Alloy Product Formed of IA-2 and Casting Alloy Product of CA-5)

A cast article (8 mm in diameter×10 mm in height) was formed of each of the alloy powder IA-2 and the alloy powder CA-5 with the particle size L prepared in Experimental 1 by precision casting. Each cast article was subjected to the solution heat treatment step S3 and the aging heat treatment step S4 in a similar manner to the above to manufacture a cast alloy product formed of the alloy powder IA-2 or another cast alloy product formed of the alloy powder CA-5.

(Microstructure Observation and Mechanical Properties Testing)

Test pieces for microstructure observation and mechanical properties testing were taken from the AM articles, the cast articles, and the products manufactured above and subjected to microstructure observation and mechanical properties testing.

The microstructure observation was performed by SEM. Also, the obtained SEM images were subjected to image analysis using an image processing program (ImageJ, a public domain program developed at the National Institutes of Health, or NIH) to measure the average size of segregation cells, the average spacing of microsegregation, and the average intergrain distance between carbide phase grains.

For the mechanical properties testing, a tensile test was performed at room temperature (approximately 23° C.) to measure the 0.2% proof stress.

Figure 5:
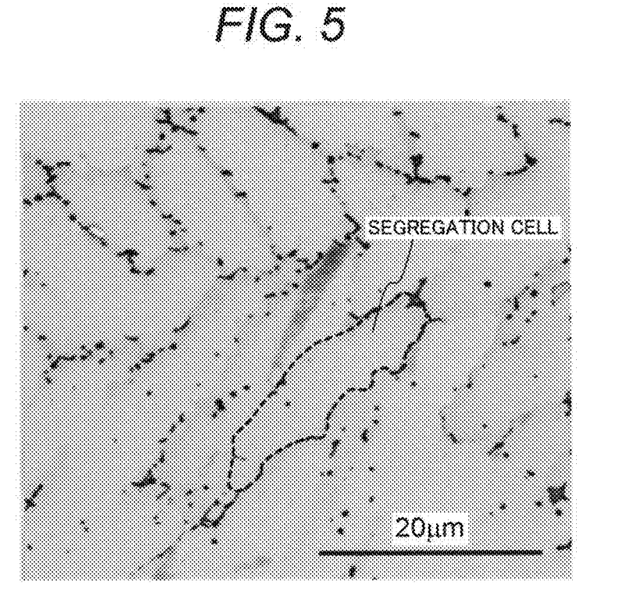
FIG. 5 is an SEM image showing an exemplary microstructure of a Co based alloy AM article formed by LMD.
Figure 6:
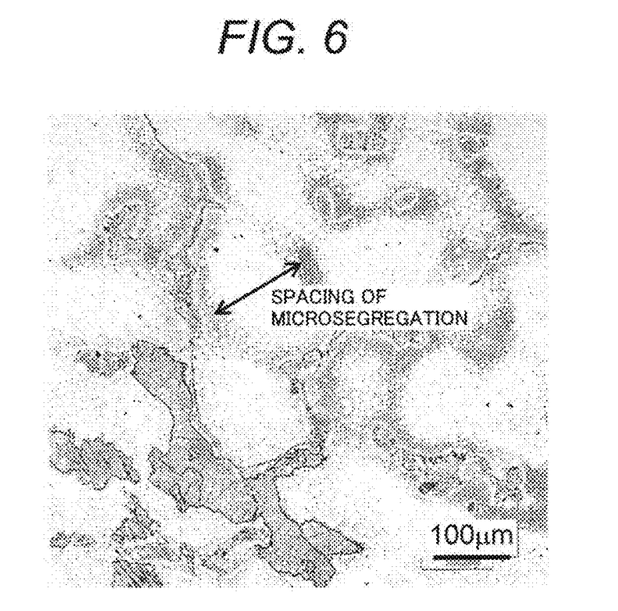
FIG. 6 is an SEM image showing an exemplary microstructure of a Co based alloy cast article formed by precision casting.

FIG. 5 is an SEM image showing an exemplary microstructure of a Co based alloy AM article formed by LMD. FIG. 6 is an SEM image showing an exemplary microstructure of a Co based alloy cast article formed by precision casting. Also, FIG. 2 above is an SEM image showing an exemplary microstructure of a Co based alloy AM article formed by SLM. The samples shown in FIGS. 2, 5, and 6 are formed of the alloy powder IA-2.

As mentioned before, the AM article formed by SLM (see FIG. 2) is a polycrystalline body that has segregation cells of about 1 μm in size formed in its crystal grains. In contrast, the AM article formed by LMD (see FIG. 5) is a polycrystalline body that has segregation cells of about 5 to 20 μm in size constituting each of its crystal grain. In the cast article formed by precision casting (see FIG. 6), microsegregation is observed at its dendrite boundaries, and the spacing of the microsegregation is about 100 to 300 μm.

The microstructure observation of the products formed by subjecting the AM articles and the cast articles to the solution and aging treatments and the measurement of the average intergrain distance of carbide phase grains revealed that the average intergrain distance of each product roughly matched the average size of segregation cells or the average microsegregation spacing (the microstructures are not shown). Also, it was found that when the average size of segregation cells is extremely small (e.g. about 0.1 μm or smaller), the solution treatment and the aging treatment caused adjacent carbide phase grains to combine to form larger grains (as a result, the average intergrain distance between carbide phase grains widened).

Figure 7:
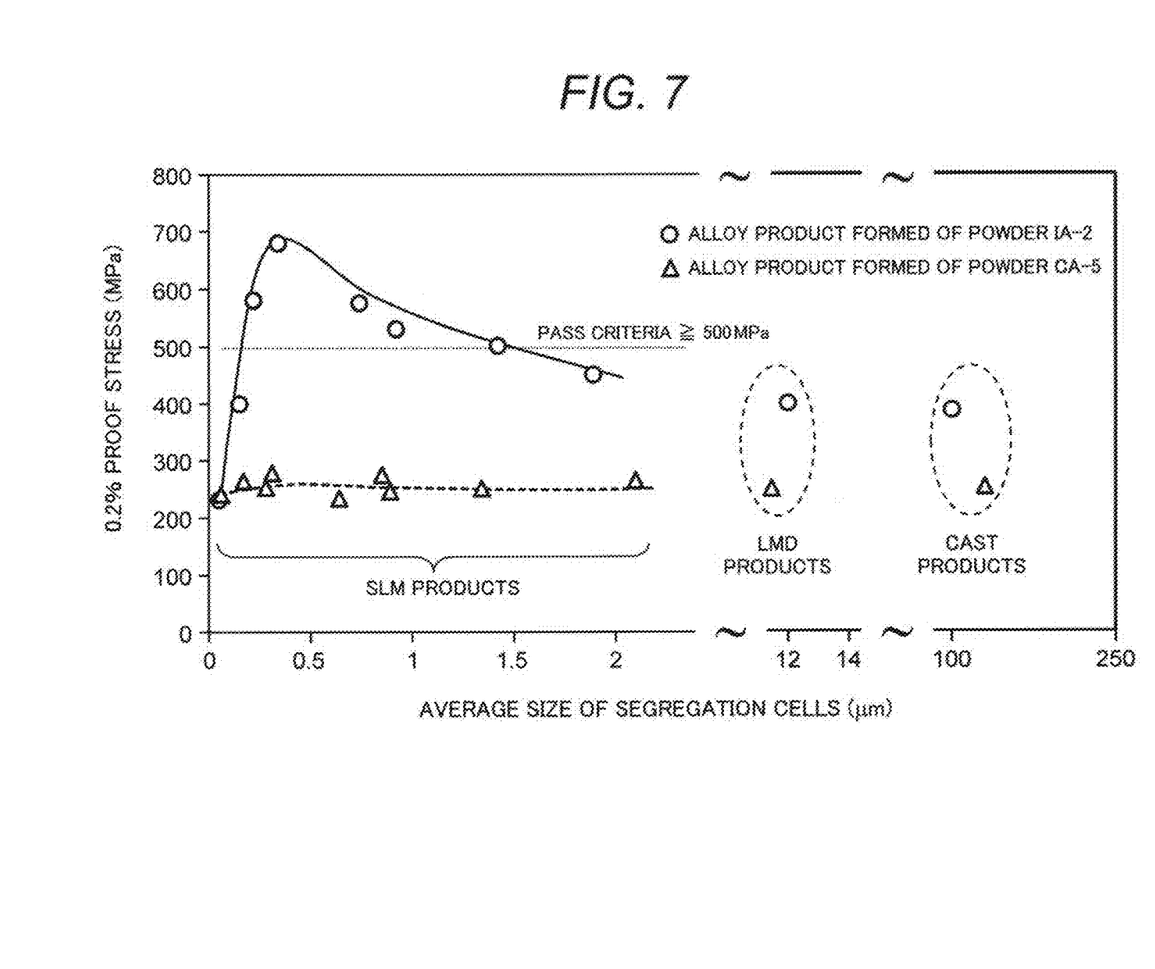
FIG. 7 is a graph showing an exemplary relationship between an average size of segregation cells of Co based alloy AM articles and a 0.2% proof stress of Co based alloy products.

Since the products obtained had largely different microstructures, a relationship between the average size of segregation cells and a mechanical property was investigated. FIG. 7 is a graph showing an exemplary relationship between the average size of segregation cells of the Co based alloy AM articles and the 0.2% proof stress of the Co based alloy products. FIG. 7 also shows the data of the cast articles and the cast alloy products for comparison. Regarding the cast articles, the average microsegregation spacing was used in place of the average size of segregation cells.

As shown in FIG. 7, the Co based alloy products formed of the powder CA-5 exhibit an almost constant 0.2% proof stress without being affected by the average size of segregation cells. By contrast, the Co based alloy products formed of the powder IA-2 largely vary in the 0.2% proof stress according to the average size of segregation cells.

The powder CA-5 has a total content of "Ti+Zr+Nb+Ta" that is too small (i.e. it contains almost none of them). Therefore, the products formed of the powder CA-5 have microstructures in which no reinforcing carbide phase is precipitated, but Cr carbide grains are precipitated. This confirms that Cr carbide grains are not very effective as precipitation strengthening grains. In contrast, the products formed of the powder IA-2 have microstructures in which reinforcing carbide phase grains are precipitated. This is believed to have caused the substantial variation in 0.2% proof stress depending on the average segregation cell size (which determines the average intergrain distance between carbide phase grains).

Also, considering the prescribed properties of turbine high temperature components toward which the invention is directed, a 0.2% proof stress of 500 MPa or more is required. So, when any 0.2% proof stress of 500 MPa or more is judged as "Passed", and any 0.2% proof stress of less than 500 MPa is judged as "Failed", it has been confirmed that mechanical properties that qualify as "Passed" are obtained with the average segregation cell size (i.e. the average intergrain distance between carbide phase grains) ranging from 0.15 to 1.5 μm. In other words, conventional carbide phase-precipitated Co based alloy materials have failed to exhibit sufficient mechanical properties partly because the average intergrain distance between reinforcing carbide phase grains has not been successfully controlled to fall within a desired range.

[Experimental 3]

(Manufacturing of SLM Alloy Products IP-1-1 to IP-5-1 Formed of IA-1 to IA-5 and SLM Alloy Products CP-1-1 to CP-5-1 Formed of CA-1 to CA-5)

An AM article (8 mm in diameter×10 mm in height) was formed of each of the alloy powders IA-1 to IA-5 and CA-1 to CA-5 of the particle size S prepared in Experimental 1 by SLM (the selective laser melting step S2). Based on the results obtained in Experimental 2, the SLM process was performed with the average intergrain distance between carbide phase grains controlled to 0.15 to 1.5 μm.

Each AM article formed above was subjected to heat treatment at 1,150° C. with a holding duration of 4 hours (the solution heat treatment step S3). Then, the solution heat-treated AM articles were each subjected to heat treatment within a range from 750 to 1,000° C. with a holding duration of 0.5 to 10 hours (the aging heat treatment step S4) to manufacture SLM alloy products IP-1-1 to IP-5-1 formed of the powders IA-1 to IA-5 and SLM alloy products CP-1-1 to CP-5-1 formed of the powders CA-1 to CA-5.

(Microstructure Observation and Mechanical Properties Testing)

Test pieces for microstructure observation and mechanical properties testing were taken from the SLM alloy products IP-1-1 to IP-5-1 and CP-1-1 to CP-5-1 and subjected to microstructure observation and mechanical properties testing.

The microstructure observation was performed through image analysis of SEM images in a similar manner to Experimental 2 to measure the average matrix crystal grain size and the average intergrain distance between carbide phase grains.

As to the mechanical properties testing, a creep test was conducted at 900° C. under a stress of 98 MPa to measure the creep rupture time. Based on the prescribed properties of turbine high temperature components toward which the invention is directed, any creep rupture time of 1,100 hours or more was judged as "Passed", and any creep rupture time of less than 1,100 hours was judged as "Failed". When the creep properties are judged as "Passed", the temperature at which the creep rupture time reaches 100,000 hours under a stress of 58 MPa is 875° C. or higher. Such creep properties can be deemed as comparable to those of Ni based alloy materials.

The results of Experimental 3 are shown in Table 2.

TABLE 2

Measurement and Testing Results of SLM Alloy Products IP-1-1 to IP-5-1 and CP-1-1 to CP-5-1.

| Alloy Product No. | Alloy Powder No. | Average Matrix Crystal Grain Size (μm) | Average Intergrain Distance Between Reinforcing Carbide Phase Grains (μm) | Creep Test |
|---|---|---|---|---|
| IP-1-1 | IA-1 | 75 | 0.6 | Passed |
| IP-2-1 | IA-2 | 90 | 0.3 | Passed |
| IP-3-1 | IA-3 | 60 | 0.8 | Passed |
| IP-4-1 | IA-4 | 95 | 1.1 | Passed |
| IP-5-1 | IA-5 | 85 | 1.5 | Passed |
| CP-1-1 | CA-1 | 90 | Cr Carbide Phase Precipitation | Failed |
| CP-2-1 | CA-2 | 65 | 2.5 | Failed |
| CP-3-1 | CA-3 | 75 | Cr Carbide Phase Precipitation | Failed |
| CP-4-1 | CA-4 | 95 | No Reinforcing Carbide Phase | Failed |
| CP-5-1 | CA-5 | 70 | No Reinforcing Carbide Phase | Failed |

As shown in Table 2, the SLM alloy products IP-1-1 to IP-5-1 all passed the creep testing. This is not only because the average matrix crystal grain size is within the appropriate range but also because the average intergrain distance between reinforcing carbide phase grains (MC type carbide phase grains of Ti, Zr, Nb, and/or Ta) is sufficiently small (i.e. the reinforcing carbide phase grains are finely and dispersedly precipitated).

On the other hand, the SLM alloy products CP-1-1 to CP-5-1 all failed the creep testing, although the average matrix crystal grain size was within the appropriate range. To determine possible causes behind this, the SLM alloy products CP-1-1 to CP-5-1 were examined individually. Regarding CP-1-1, the excessive contents of C and Cr have resulted in dominant precipitation of Cr carbide grains. Regarding CP-2-1, the excessive content of C and the excessive total content of "Ti+Zr+Nb+Ta" have resulted in coarsening of the reinforcing carbide phase grains and an increased average intergrain distance. Regarding CP-3-1, the excessive content of C and the insufficient total content of "Ti+Zr+Nb+Ta" have resulted in dominant precipitation of the Cr carbide grains. These results confirm that Cr carbide grains are not very effective as precipitation strengthening grains. Regarding CP-4-1 and CP-5-1, the insufficient total content of "Ti+Zr+Nb+Ta" (almost none) has resulted in no precipitation of the reinforcing carbide phase itself.

Based on the results of Experimental 3, it has been confirmed that IA-1 to IA-5, which have the chemical compositions specified in the invention, are desirable as starting materials for SLM alloy products. It has also been confirmed that creep properties can be improved by controlling the average intergrain distance between reinforcing carbide phase grains to 0.15 to 1.5 μm.

[Experiment 4]

(Manufacturing of SLM Alloy Products IP-1-2 to IP-1-7 and IP-2-2 to IP-2-7)

AM articles (8 mm in diameter×10 mm in height) were formed of the alloy powders IA-1 and IA-2 of the particle size S prepared in Experimental 1 by SLM (the selective laser melting step S2). Based on the results obtained in Experimental 2, the SLM process was performed with the average intergrain distance between carbide phase grains controlled to 0.15 to 1.5 μm.

Each AM article formed above was subjected to the solution treatment and the aging treatment. By varying the temperature and the holding duration of the solution treatment within ranges from 1,000 to 1,300° C. and from 0.5 to 10 hours, respectively, SLM alloy products IP-1-2 to IP-1-7 and IP-2-2 to IP-2-7 varying in average matrix crystal grain size were manufactured. The aging treatment conditions were set to be the same as Experimental 3.

(Microstructure Observation and Mechanical Properties Testing)

Test pieces for microstructure observation and mechanical properties testing were taken from the SLM alloy products IP-1-2 to IP-1-7 and IP-2-2 to IP-2-7 and subjected to microstructure observation and mechanical properties testing.

The microstructure observation was performed through image analysis of SEM images in a similar manner to Experimental 2 to measure the average matrix crystal grain size. Also, as mechanical properties testing, a creep test was conducted in a similar manner to Experimental 2, and each product was judged as "Passed" or "Failed" based on the same criteria as Experimental 2. The results of Experiment 4 are shown in Table 3.

TABLE 3

Measurement and Testing Results of SLM Alloy Products IP-1-2 to IP-1-7 and IP-2-2 to IP-2-7.

| Alloy Product No. | Alloy Powder No. | Average Matrix Crystal Grain Size (μm) | Creep Test |
|---|---|---|---|
| IP-1-2 | IA-1 | 11 | Failed |
| IP-1-3 |  | 15 | Failed |
| IP-1-4 |  | 43 | Passed |
| IP-1-5 |  | 74 | Passed |
| IP-1-6 |  | 151 | Failed |
| IP-1-7 |  | 180 | Failed |
| IP-2-2 | IA-2 | 15 | Failed |
| IP-2-3 |  | 32 | Passed |
| IP-2-4 |  | 56 | Passed |
| IP-2-5 |  | 74 | Passed |
| IP-2-6 |  | 141 | Passed |
| IP-2-7 |  | 200 | Failed |

As shown in Table 3, it has been confirmed that the average matrix crystal grain size is preferably 20 to 145 μm. Also, based on the results of Experimental 4, it has been confirmed that the solution treatment is preferably performed within a temperature range of 1,100 to 1,200° C. with a holding duration of 0.5 to 10 hours.

[Experiment 5]

(Examination of SLM Conditions in Selective Laser Melting Step)

AM articles (8 mm in diameter×10 mm in height) were formed of the alloy powders IA-4 of the particle size S prepared in Experimental 1 by SLM (the selective laser melting step S2). The output power of the laser beam P was set at 85 W, and the local heat input P/S (unit: W×s/mm=J/mm) was controlled by varying the thickness of the alloy powder bed h and the scanning speed (mm/s) of the laser beam S.

The AM articles formed above were each subjected to microstructure observation to measure the average segregation cell size. As with Experimental 2, the microstructure observation was conducted by SEM and the measurement was conducted using an image processing program (ImageJ).

Figure 8:
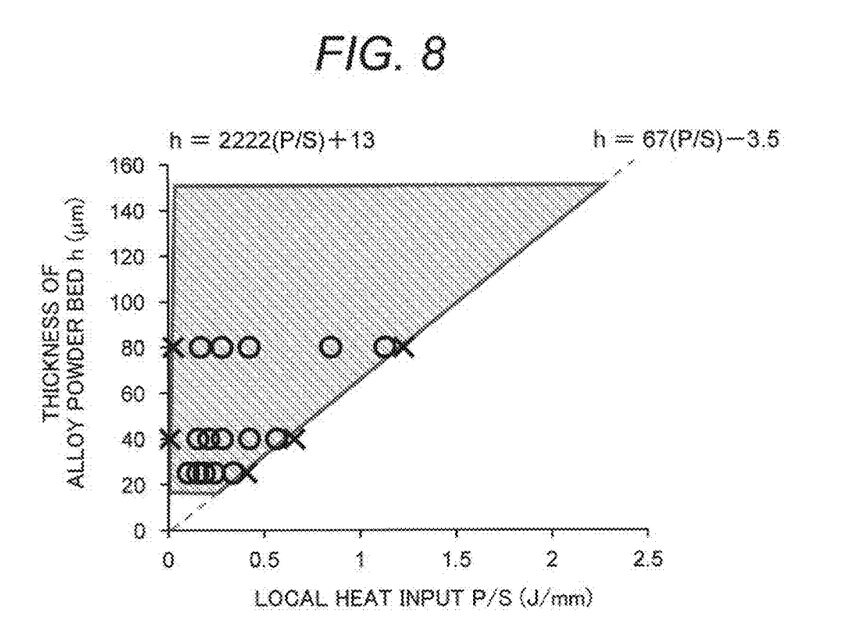
FIG. 8 shows exemplary SLM conditions to obtain a Co based alloy AM article according to an embodiment of the invention, indicating a relationship between a thickness of an alloy powder bed and a local heat input.

FIG. 8 shows exemplary SLM conditions to obtain a Co based alloy AM article according to the embodiment of the invention, indicating a relationship between the thickness of the alloy powder bed and the local heat input. In FIG. 8, "o" signifies the AM articles observed to have an average segregation cell size within a range of 0.15 to 1.5 µm and judged as "Passed", and "x" signifies the other AM articles, judged as "Failed".

Based on the results of Experimental 5, it has been confirmed that in the selective laser melting step S2, the SLM process is preferably performed while controlling the thickness of the alloy powder bed h (unit: µm), the output power of the laser beam P (unit: W), and the scanning speed of the laser beam S (unit: mm/s) such that they satisfy the following formulas: "15<h<150" and "67× (P/S)−3.5<h<2222×(P/S)+13". In other words, the hatched region is the Passed region.

The above-described embodiments and Examples have been specifically given in order to help with understanding on the present invention, but the invention is not limited to the described embodiments and Examples. For example, a part of an embodiment may be replaced by known art, or added with known art. That is, a part of an embodiment of the invention may be combined with known art and modified based on known art, as far as no departing from a technical concept of the invention.

What is claimed is:

1. An additive manufactured article made by selective laser melting formed of a cobalt based alloy, the cobalt based alloy having a chemical composition comprising:
    0.08 to 0.25 mass % of carbon;
    0.1 mass % or less of boron;
    10 to 30 mass % of chromium;
    5 mass % or less of iron, 30 mass % or less of nickel, the total amount of the iron and the nickel being 30 mass % or less;
    tungsten and/or molybdenum, the total amount of the tungsten and the molybdenum being 5 to 12 mass %;
    titanium, zirconium, niobium and tantalum, the total amount of the titanium, the zirconium, the niobium and the tantalum being 0.5 to 2 mass %;
    0.5 mass % or less of silicon;
    0.5 mass % or less of manganese;
    0.003 to 0.04 mass % of nitrogen; and
    the balance being cobalt and impurities,
    wherein the additive manufactured article is a polycrystalline body comprising crystal grains with an average crystal grain size of 10 to 100 µm, and
    wherein in the crystal grains of the polycrystalline body, segregation cells with an average size of 0.15 to 1.5 µm are formed, in which components constituting an MC type carbide phase comprising carbides of the titanium, the zirconium, the niobium and/or the tantalum are segregated in boundary regions of the segregation cells, and/or
    wherein grains of the MC type carbide phase are precipitated at an average intergrain distance of 0.15 to 1.5 µm.

2. The cobalt based alloy additive manufactured article according to claim 1, wherein
    the chemical composition of the cobalt based alloy comprises 0.01 to 1 mass % of the titanium, 0.05 to 1.5 mass % of the zirconium, 0.02 to 1 mass % of the niobium, and 0.05 to 1.5 mass % of the tantalum.

3. The cobalt based alloy additive manufactured article according to claim 1, wherein
    the chemical composition of the cobalt based alloy comprises, as the impurities, 0.5 mass % or less of aluminum and 0.04 mass % or less of oxygen.

4. A cobalt based alloy product formed of a cobalt based alloy, the cobalt based alloy having a chemical composition comprising:
    0.08 to 0.25 mass % of carbon;
    0.1 mass % or less of boron;
    10 to 30 mass % of chromium;
    5 mass % or less of iron, 30 mass % or less of nickel, the total amount of the iron and the nickel being 30 mass % or less;
    tungsten and/or molybdenum, the total amount of the tungsten and the molybdenum being 5 to 12 mass %;
    titanium, zirconium, niobium and tantalum, the total amount of the titanium, the zirconium, the niobium and the tantalum being 0.5 to 2 mass %;
    0.5 mass % or less of silicon;
    0.5 mass % or less of manganese;
    0.003 to 0.04 mass % of nitrogen; and
    the balance being cobalt and impurities,
    wherein the product is a polycrystalline body comprising crystal grains with an average crystal grain size of 20 to 145 µm, and
    wherein in the crystal grains of the polycrystalline body, grains of an MC type carbide phase comprising carbides of the titanium, the zirconium, the niobium and/or the tantalum are precipitated at an average intergrain distance of 0.15 to 1.5 µm.

5. The cobalt based alloy product according to claim 4, wherein
    the product exhibits a 0.2% proof stress of 500 MPa or more at room temperature and a creep temperature endurable for 100,000 hours at a stress of 58 MPa being 875° C. or higher.

6. The cobalt based alloy product according to claim 4, wherein
    the chemical composition of the cobalt based alloy comprises 0.01 to 1 mass % of the titanium, 0.05 to 1.5 mass % of the zirconium, 0.02 to 1 mass % of the niobium, and 0.05 to 1.5 mass % of the tantalum.

7. The cobalt based alloy product according to claim 4, wherein
    the chemical composition of the cobalt based alloy comprises, as the impurities, 0.5 mass % or less of aluminum and 0.04 mass % or less of oxygen.

8. The cobalt based alloy product according to claim 4, wherein
    the product is a turbine high temperature component.

9. The cobalt based alloy product according to claim 8, wherein
    the turbine high temperature component is a turbine stator blade or a combustor nozzle.

10. A method for manufacturing the cobalt based alloy additive manufactured article according to claim 1, the method comprising:
    an alloy powder preparation step of preparing a cobalt based alloy powder having the chemical composition, the cobalt based alloy powder having a particle size; and
    a selective laser melting step of forming an additive manufactured article, the step comprising alternate repetition of an alloy powder bed preparation substep of laying the cobalt based alloy powder such that it forms an alloy powder bed having a predetermined thickness and a laser melting solidification substep of irradiating a predetermined region of the alloy powder bed with a laser beam to locally melt and rapidly solidify the cobalt based alloy powder in the region, the laser beam having an output power and a scanning speed, wherein the predetermined thickness of the alloy powder bed h (unit: μm), the output power of the laser beam P (unit: W), and the scanning speed of the laser beam S (unit: mm/s) are controlled to satisfy the following formulas: "15<h<150" and "67×(P/S)−3.5<h<2222×(P/S)+13".

11. The method for manufacturing the cobalt based alloy additive manufacturing article according to claim 10, wherein the alloy powder preparation step comprises an alloy powder classification substep of regulating the particle size of the cobalt based alloy powder to 5 to 100 μm.

12. A method for manufacturing the cobalt based alloy product according to claim 4, the method comprising:

an alloy powder preparation step of preparing a cobalt based alloy powder having the chemical composition, the cobalt based alloy powder having a particle size;

a selective laser melting step of forming an additive manufactured article, the step comprising alternate repetition of an alloy powder bed preparation substep of laying the cobalt based alloy powder such that it forms an alloy powder bed having a predetermined thickness and a laser melting solidification substep of irradiating a predetermined region of the alloy powder bed with a laser beam to locally melt and rapidly solidify the cobalt based alloy powder in the region, the laser beam having an output power and a scanning speed; and a solution heat treatment step of subjecting the additive manufactured article to a solution treatment at temperatures ranging from 1,100 to 1,200° C. with a holding duration of 0.5 to 10 hours, wherein the predetermined thickness of the alloy powder bed h (unit: μm), the output power of the laser beam P (unit: W), and the scanning speed of the laser beam S (unit: mm/s) are controlled to satisfy the following formulas: "15<h<150" and "67×(P/S)−3.5<h<2222×(P/S)+13".

13. The method for manufacturing the cobalt based alloy product according to claim 12, wherein the alloy powder preparation step comprises an alloy powder classification substep of regulating the particle size of the cobalt based alloy powder to 5 to 100 μm.

14. The method for manufacturing the cobalt based alloy product according to claim 12, wherein the method further comprises an aging heat treatment step of subjecting the additive manufactured article to an aging treatment at temperatures ranging from 750 to 1,000° C. with a holding duration of 0.5 to 10 hours after the solution heat treatment step.

15. The method for manufacturing the cobalt based alloy product according to claim 13, wherein the method further comprises an aging heat treatment step of subjecting the additive manufactured article to an aging treatment at temperatures ranging from 750 to 1,000° C. with a holding duration of 0.5 to 10 hours after the solution heat treatment step.

16. The cobalt based alloy additive manufactured article according to claim 2, wherein the chemical composition of the cobalt based alloy comprises, as the impurities, 0.5 mass % or less of aluminum and 0.04 mass % or less of oxygen.

17. The cobalt based alloy product according to claim 6, wherein the chemical composition of the cobalt based alloy comprises, as the impurities, 0.5 mass % or less of aluminum and 0.04 mass % or less of oxygen.

* * * * *